United States Patent
Ohnishi et al.

(10) Patent No.: US 8,559,734 B2
(45) Date of Patent: Oct. 15, 2013

(54) IMAGE ENCODING APPARATUS AND METHOD FOR THE SAME AND IMAGE DECODING APPARATUS AND METHOD FOR THE SAME

(75) Inventors: Naoya Ohnishi, Tokyo (JP); Tomoo Yamakage, Kanagawa-ken (JP); Tomoya Kodama, Kanagawa-ken (JP); Hiroaki Fukui, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 277 days.

(21) Appl. No.: 13/023,018

(22) Filed: Feb. 8, 2011

(65) Prior Publication Data

US 2011/0262037 A1  Oct. 27, 2011

(30) Foreign Application Priority Data

Apr. 23, 2010  (JP) ................................. 2010-100111

(51) Int. Cl.
G06K 9/36  (2006.01)

(52) U.S. Cl.
USPC ........................................................ 382/232

(58) Field of Classification Search
USPC ............................................... 382/232–253
See application file for complete search history.

(56) References Cited

U.S. PATENT DOCUMENTS

2009/0087111 A1  4/2009  Noda et al.

FOREIGN PATENT DOCUMENTS

WO  WO 2007/114368 A1  10/2007

OTHER PUBLICATIONS

Japanese Office Action Issued Apr. 17, 2012 in Patent Application No. 2010-100111 (English translation only).

*Primary Examiner* — Alex Liew
(74) *Attorney, Agent, or Firm* — Oblon, Spivak, McClelland, Maier & Neustadt, L.L.P.

(57) ABSTRACT

In one embodiment, an image encoding apparatus converts bit depth of an input image formed of a plurality of pixels each having an N bit depth into an (N+M) bit depth larger than N bit depth by M bits. An adaptive bit depth converter converts the bit depth of each pixel of the decoded image of the (N+M) bits into the N bits selectively using one of a plurality of conversion systems. The converted image of the N bit depth is stored in a frame memory as a reference image. The bit depth of each pixel of the reference image of the N bit depth read out from the frame memory is converted into the (N+M) bit depth larger than the N bit depth by M bits in accordance with the conversion system by a pixel bit depth inverse converter.

16 Claims, 10 Drawing Sheets

Bit depth conversion by rounding with reference to "0"
(I+8)>>4

Bit depth conversion by rounding with reference to "2048"
(I+sign(x−2048)×8)>>4

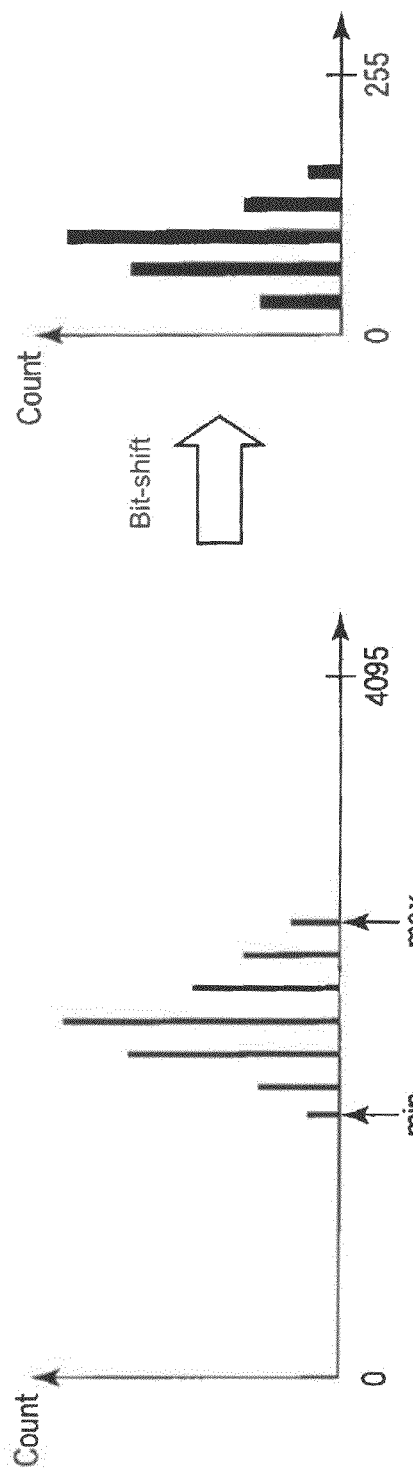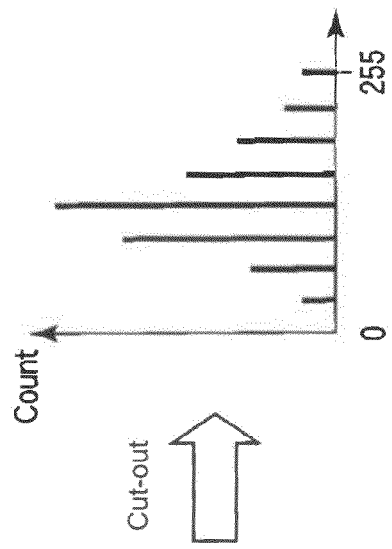

IMAGE ENCODING APPARATUS AND METHOD FOR THE SAME AND IMAGE DECODING APPARATUS AND METHOD FOR THE SAME

CROSS-REFERENCE TO RELATED APPLICATION

This application is based upon and claims the benefit of priority from prior Japanese Patent Application No. 2010-100111, filed Apr. 23, 2010, the entire contents of which are incorporated herein by reference.

FIELD

The present invention relates to an image encoding apparatus and a method for the same and an image decoding apparatus and a method for the same.

BACKGROUND

H.264 which is a representative video encoding standard system is cited as a lossy compression system. In the H.264, orthogonal transform such as discrete cosine transform (DCT) etc. is performed to a prediction error signal between an input image signal and a prediction image signal generated by intra-prediction or motion compensation, and further compression processing is done to the transform coefficients to create an encoded image by quantization and encoding.

For example, International Publication No. 2007/114368 (Page. 19, FIG. 11B) discloses a technique to convert an input image of an N bit depth into an image of an (N+M) bit depth larger than the N bit depth by M bits, and further convert the converted image signal into an (N+M−L) bit depth. Then, the converted image signal is stored in a frame memory. For example, when L=M, even if the bit depth is enlarged by M bits, the image signal is stored in the frame memory as an image signal of the N bit depth. Therefore, it becomes possible to prevent increase in the capacity of the frame memory. When reading out the image signal from the frame memory, the image signal of the (N+M−L) bit depth is converted into the image signal of the (N+M) bit depth.

With above-mentioned technique, when the image signal is stored in the frame memory, the image of the (N+M) bit depth is converted into the image of the (N+M−L) bit depth by a bit-shift process. For this reason, in an image with a wide dynamic range, an error may arise in the bit-shift process, and coding efficiency may fall. Moreover, although the same conversion system is used for a luminosity signal and two color-difference signals, when cutting off the bit, it is preferable to select respective processes suitable for the luminosity and the color-difference component.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5A to FIG. 5C are figures showing a bit-shift conversion process and a clipping process by the adaptive pixel bit depth converter.

DETAILED DESCRIPTION OF THE INVENTION

Figure 1:
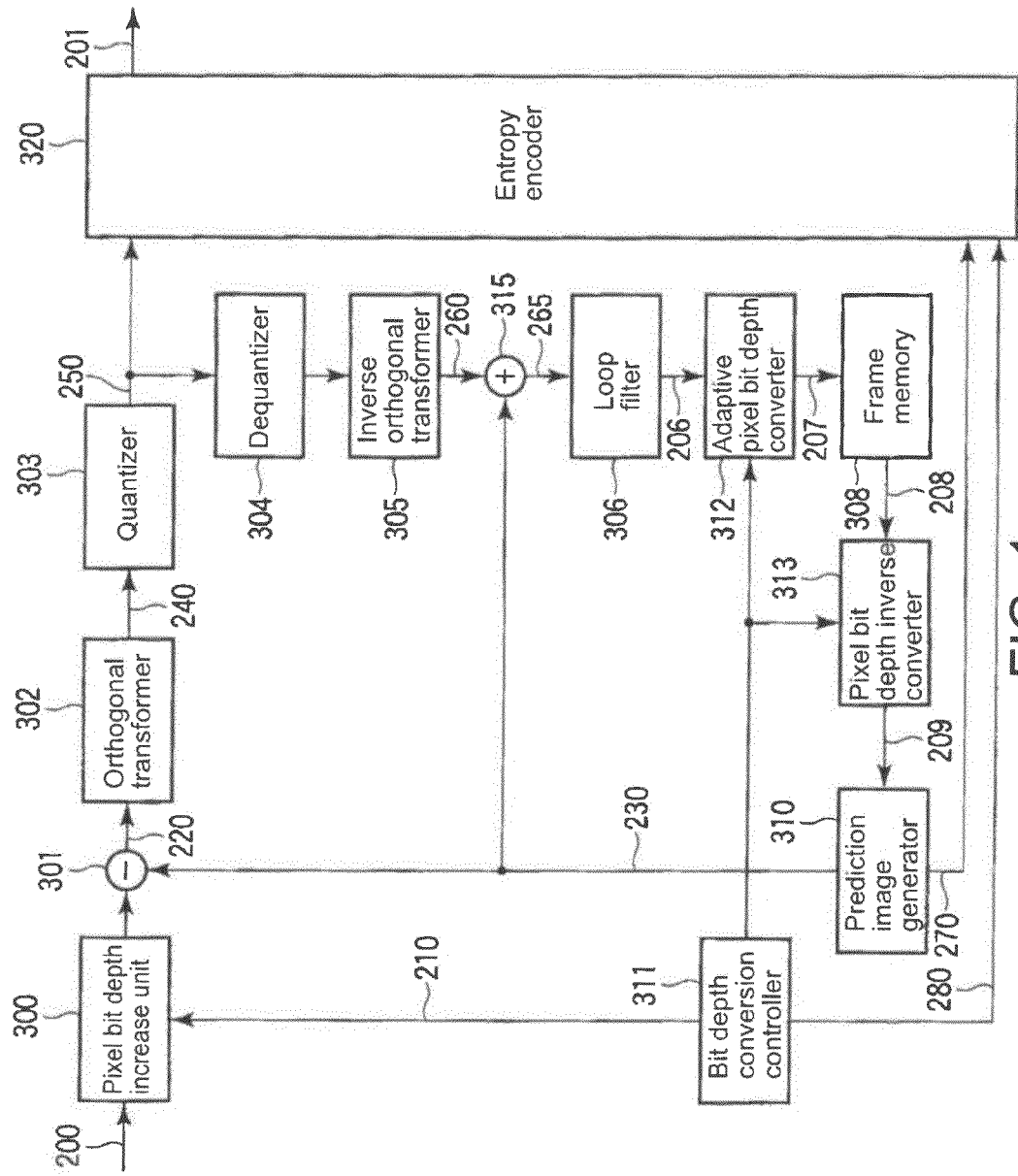
FIG. 1 is a figure showing an image encoding apparatus according to one embodiment of the present invention.

An image encoding apparatus and a method for the same and an image decoding apparatus and a method for the same according to an exemplary embodiment of the present invention will now be described with reference to the accompanying drawings wherein the same or like reference numerals designate the same or corresponding parts throughout the several views.

According to one embodiment, an image encoding apparatus includes: a pixel bit depth increase unit to convert bit depth of each pixel of an input image formed of a plurality of pixels each having an N bit depth into an (N+M) bit depth larger than the N bit depth by M bits; a prediction image generator to generate a prediction image of the (N+M) bit depth corresponding to the input image of the (N+M) bit depth from a reference image of the (N+M) bit depth; a subtracter to calculate a differential signal of between the input image of the (N+M) bit depth and the prediction image of the (N+M) bit depth; an encoding unit to output encoded image information by encoding the differential signal; a decoding unit to output a decoded difference image based on the encoded image information; an adder to add the prediction image of the (N+M) bit depth to the decoded difference image and output a decoded image of the (N+M) bit depth; a pixel bit depth converter to convert the bit depth of each pixel of the decoded image of the (N+M) bit to the N bit depth selectively using one of a plurality of mutually different conversion systems; a reference image storing memory to store the decoded image converted into the N bit depth as the reference image; and a pixel bit depth inverse converter to convert the bit depth of each pixel of the reference image of the N bit depth read out from the reference image storing memory into the (N+M) bit depth larger than the N bit depth by M bits in accordance with the conversion system.

According to other embodiment, an image decoding apparatus includes: a decoding unit to output a decoded difference image on receiving an encoded image information of an (N+M) bit depth; a prediction image generator to generate a prediction image of the (N+M) bit depth by a reference image of the (N+M) bit depth using the encoded image information; an adder to add the prediction image of the (N+M) bit depth to the decoded difference image and output a decoded image of the (N+M) bit depth; a pixel bit depth converter to convert each pixel of the decoded image of the (N+M) bit into the N bit depth selectively using one of a plurality of mutually different conversion systems; a reference image storing memory to store the decoded image converted into the N bit depth as the reference image; and a pixel bit depth inverse converter to convert the bit depth of each pixel of the reference image of the N bit depth into the (N+M) bit depth larger than N bit depth by M bits in accordance with the conversion system.

According to other embodiment, an image encoding method includes the steps: converting a bit depth of each pixel of an input image formed of a plurality of pixels each having an N bit depth into an (N+M) bit depth larger than the N bit depth by M bits; generating a prediction image of the (N+M) bit depth corresponding to the input image of the (N+M) bit depth by a reference image of the (N+M) bit depth; obtaining a differential signal between the input image of the (N+M) bit depth and the prediction image of the (N+M) bit depth; outputting an encoded image information by encoding the differential signal; outputting a decoded difference image based on the encoded image information; adding the prediction image of the (N+M) bit depth to the decoded difference image and output a decoded image of the (N+M) bit depth; converting the bit depth of each pixel of the decoded image of the (N+M) bit into the N bit depth selectively using one of a plurality of mutually different conversion systems; storing the decoded image converted into the N bit depth as the reference image; and converting the bit depth of each pixel of the reference image of the N bit depth read out from the reference image storing memory into the (N+M) bit depth larger than N bit depth by M bits in accordance with the conversion system.

According to other embodiment, an image decoding method includes the steps: outputting a decoded difference image on receiving an encoded image information of an (N+M) bit depth; generating a prediction image of the (N+M) bit depth by a reference image of the (N+M) bit depth using the encoded image information; adding the prediction image of the (N+M) bit depth to the decoded difference image and outputting a decoded image of the (N+M) bit depth; converting the bit depth of each pixel of the decoded image of the (N+M) bit into the N bit depth selectively using one of a plurality of mutually different conversion systems; storing the decoded image converted into the N bit depth as the reference image; and converting the bit depth of each pixel of the reference image of the N bit depth into the (N+M) bit depth larger than N bit depth by M bits in accordance with the conversion system.

[Image Encoding Apparatus]

FIG. 1 is a block diagram showing an image encoding apparatus according to one embodiment.

As shown in FIG. 1, the image encoding apparatus includes a pixel bit depth increase unit (pixel bit depth converter) 300, a subtracter 301, an orthogonal transformer 302, a quantizer 303, a dequantizer 304, an inverse orthogonal transformer 305, an adder 315, a loop filter 306, an adaptive pixel bit depth converter 312, a frame memory 308, a pixel bit depth inverse converter 313, a prediction image generator 310, a bit depth conversion controller 311, and an entropy encoder 320.

The input image signal 200 is received by the pixel bit depth increase unit 300, and the output signal of the pixel bit depth increase unit 300 is input to the subtracter 301. The orthogonal transformer 302 carries out orthogonal transform of a prediction error signal 220 output from the subtracter 301 and outputs an orthogonal transform coefficient information 240. The quantizer 303 quantizes the orthogonal transform coefficient information 240 and outputs a quantized orthogonal transform coefficient information 250.

The quantized orthogonal transform coefficient information 250 output from the quantizer 303 is distributed into two systems. One side information is input to the entropy encoder 320, and another side information is led to the dequantizer 304. The quantized orthogonal transform coefficient information 250 from the quantizer 303 is locally decoded by the dequantizer 304 and the inverse orthogonal transformer 305 and led to the adder 315.

The local decoded image signal 265 output from the adder 315 is led to the frame memory 308 through the loop filter 306 and the adaptive pixel bit depth converter 312. The previous stage of the frame memory 308 is equipped with the adaptive pixel bit depth converter 312, and its rear stage is equipped with the pixel bit depth inverse converter 313.

The output from the frame memory 308 is led to the prediction image generator 310 through the pixel bit depth inverse converter 313. The prediction image generator 310 outputs a prediction image signal 230, and then the prediction image signal 230 is input to the subtracter 301 and the adder 315. Moreover, information on motion vector and prediction mode output from the prediction image generator 310 is input to the entropy encoder 320.

The bit depth conversion controller 311 subjects a bit conversion information 210 to input to the pixel bit depth increase unit 300 and also input a bit depth increase information 280 to the entropy encoder 320. Moreover, the bit depth conversion controller 311 subjects the bit depth increase information 280 to input to the adaptive pixel bit depth converter 312 and pixel bit depth inverse converter 313.

Figure 2:
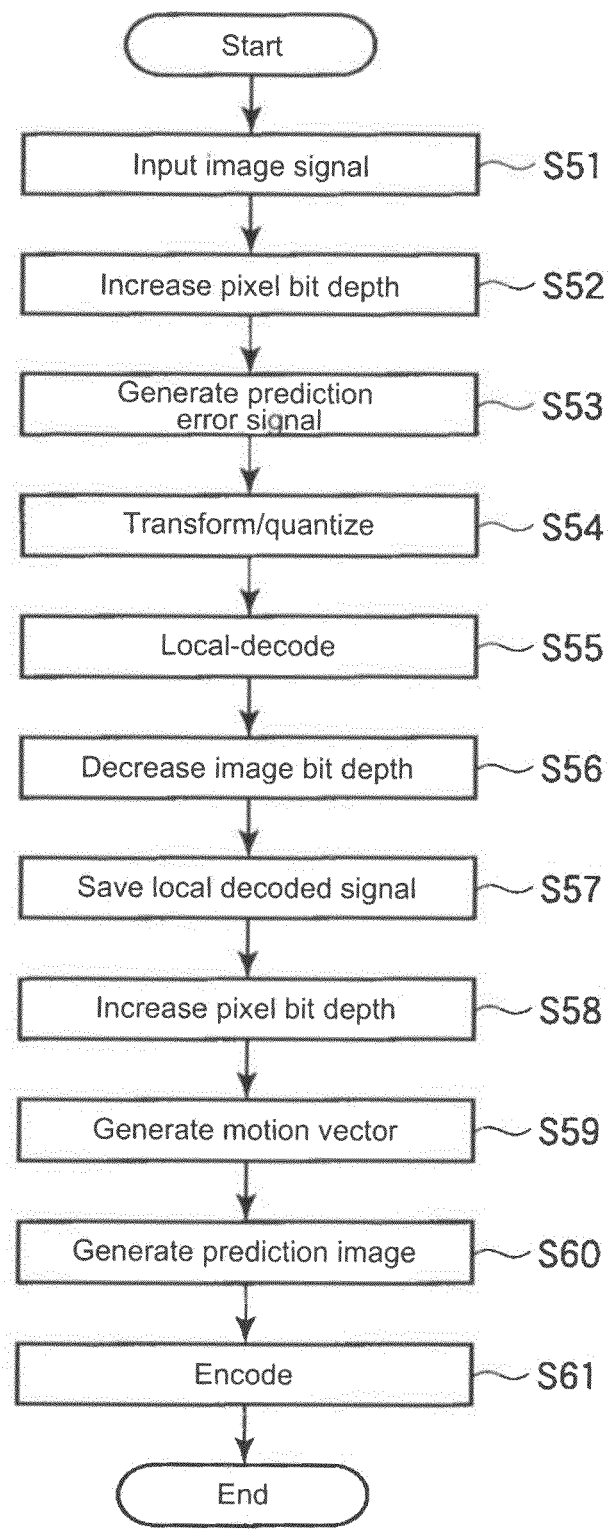
FIG. 2 is a flow chart showing operation of the image encoding apparatus shown in FIG. 1.

Then, with reference to FIG. 2, operation of the image encoding apparatus configured as mentioned-above is explained. FIG. 2 is a flow chart showing the operation of the image encoding apparatus.

The video signal 200 of an N bit depth is input to the image encoding apparatus, for example, in units of frame (Step S51). The pixel bit depth increase unit 300 performs a processing which increases the value of each pixel of the input image signal 200 to an (N+M) bit depth larger than N bit depth by M bits (Step S52).

Pixel value K' created by performing the increasing processing of M bits about the pixel value K of a certain pixel of the image signal 200 is, for example, calculated by the following equation (1).

$$K'=K<<M \qquad(1)$$

Moreover, for example, a gamma conversion may be carried out to the pixel in accordance with the characteristic of the display device. If the gamma value is set to $\gamma$, the pixel value K' obtained by carrying out the increasing processing of M bits to the pixel value K is calculated by the following equation (2).

$$K'=\text{int}\lfloor\lfloor\{K/(1<<N)-1\}^{\gamma}\times((1<<M)-1\rfloor+\text{offset}\rfloor \qquad(2)$$

Furthermore, it is also possible to increase the pixel value to a larger bit depth by M bits by calculating the minimum Min and the maximum Max of the pixel value of the image signal 200 while increasing the dynamic range. In this case, the pixel value K' to which the increasing processing was carried out is calculated by the following equation (3).

$$K'=\text{int}\lfloor\lfloor\{(K-\text{Min})/(\text{Max}-\text{Min})^{\gamma}\}\times((1<<M)-1\rfloor+\text{offset}\rfloor \qquad(3)$$

In the equations (2) and (3), an operator "int(x)" indicates a process for rounding a number x to an integer. Moreover, an operator "offset" indicates when the rounding is done, and it is an arbitrary value of 0 to 1.

Furthermore, it is possible to perform histogram smoothing or spatiotemporal filtering to the image signal 200 after the pixel bit depth is increased as mentioned-above.

When the input image signal 200 is a color-image signal composed of a plurality of components, such as RGB, each component may be converted into a component signal of another color space after M bits increase of the bit depth of each pixel is done for each component. For example, when the color-image signal is converted into YCoCg from RGB, it is converted according to the following equation (4).

$$R'=(R<<M), G'=(G<<M), B'=(B<<M)$$

$$Y=\text{round}(0.5*G'+0.25*(R'+B'))$$

$$Co=\text{round}(0.5*G'-0.25*(R'+B'))+(1<<(N+M-1))$$

$$Cg=\text{round}(0.5*(R'-B'))+(1<<(N+M-1)) \qquad (4)$$

In the equation (4), the bit depth of each pixel value of each component R, G or B of the input image 200 of N bit depth is increased by M bits, and then each pixel R, G or B is converted into Y, Co or Cg. Here, operator Round (A) indicates a process of rounding off a number "A" to an integer. In the conversion example of the equation (4), if the number of bits M to be increased is not less than 2, color conversion can be done without a rounding error. The color conversion described here is an example. Any processing for performing color conversion is available.

The above-mentioned conversion (step 52) is an example of the conversion that the pixel bit depth increase unit 300 carries out. The process of the increase of bit depth of each pixel by M bits is not limited to the above example, and other processes for increasing the bit depth are available. The conversion information on such number M of bits to be increased is led to the entropy encoder 320 from the bit depth conversion controller 311 as the bit depth increase information 280. However, it may not be fixed beforehand to determine whether the pixel bit depth increase unit 300 increases the bit depth of each pixel, but a predetermined flag may be used to determine.

The subtracter 301 subtracts the prediction image signal 230 of the (N+M) bit depth output from the prediction image generator 310 from the input image signal 200 whose bit depth is increased to the (N+M) bit depth, generates a prediction error signal 220 of the (N+M) bit depth, and outputs the prediction error signal 220 (Step S53).

The prediction error signal 220 is orthogonally transformed by the orthogonal transformer 302 and quantized with the quantizer 303 (Step S54). The orthogonal transformer 302 performs the orthogonal transform, such as a discrete cosine transform (DCT) etc., and generates an orthogonal transform coefficient information 240, such as a DCT coefficient etc. The quantizer 303 performs quantization processing to the orthogonal transform coefficient information 240 and outputs a quantized orthogonal transform coefficient information 250.

The quantized orthogonal transform coefficient information 250 is input to the entropy encoder 320 and the dequantizer 304. The dequantizer 304, the inverse orthogonal transformer 305, and the adder 315 perform local decoding of the quantized orthogonal transform coefficient information 250 (Step S55). The dequantizer 304 and the inverse orthogonal transformer 305 generate a local decoding error signal 260 similar to the prediction error signal 220 by a process which carries out the local decoding processing, that is, sequential inverse processing by the quantizer 303 and the orthogonal transformer 302. The prediction image signal 230 of the (N+M) bit depth is added to the local decoding error signal 260 by the adder 315, and a local decoded image signal 265 of the (N+M) bit depth is generated.

Filter processing is carried out to the local decoded image signal 265 of the (N+M) bit depth by the loop filter 306, if needed, and the filtered local decoded image signal 265 of the (N+M) bit depth is input to the adaptive pixel bit depth converter 312. The adaptive pixel bit depth converter 312 carries out decrease conversion of the value of each pixel to a value smaller by L bits, and generates a bit depth conversion signal 207 which is a reference image signal (Step S56). Here, the bit depth conversion signal 207 includes the image signal of the N bit depth, a shift amount, a representative value, and information on the conversion system.

The bit depth conversion signal 207 generated by the adaptive pixel bit depth converter 312 is stored in the frame memory 308 (Step S57).

The bit depth conversion signal 208 of the N bit depth stored in the frame memory 308 is led to the pixel bit depth inverse converter 313, if needed.

The pixel bit depth inverse converter 313 increases the bit depth of the bit depth conversion signal 208 based on the information on the image signal, the shift amount, the representative value and the conversion system included in the conversion signal 208 of the N bit depth, and generates a local decoded image signal 209 of the (N+M) bit depth (Step S58).

At the time when storing the signal in the frame memory 308 or outputting the signal from the frame memory 308, bit increasing/bit decreasing are not performed. The conversion performed by the adaptive pixel bit depth converter 312 and pixel bit depth inverse converter 313 may be any conversions as far as increasing or decreasing of the bit depth by M bits, which is the number of increased bits, is performed.

The prediction image generator 310 performs matching (for example, block matching) between the input image signal 200 to which the bit depth was increased to the (N+M) bits and the local decoded image signal 209 of the (N+M) bit depth in units of blocks in a frame, and detects a motion vector (Step S59). The prediction image generator 310 generates a prediction image signal 230 of the (N+M) bit depth using the local decoded image signal 209 of the (N+M) bit depth compensated with the motion vector (Step S60). The generated prediction image signal 230 of the (N+M) bit depth is output from the prediction image generator 310 together with a motion vector information/prediction mode information 270 in the selected prediction image signal 230.

The entropy encoder 320 carries out an entropy-encoding of the quantized orthogonal transform coefficient information 250, the motion vector information/prediction mode information 270 and a bit depth increase information 280 (Step S61). An encoded data 201 generated by the entropy encoder 320 is led to a transmission system or a storage system which is not illustrated.

In the image encoding apparatus according to this embodiment, it is also possible to switch over whether the bit increasing is performed, for example, for every arbitrary encoding unit, that is, every block, or change the number of bits to be increased.

[Adaptive Pixel Bit Depth Converter]

Next, the configuration and operation of the adaptive pixel bit depth converter 312 are explained. Here, a selection method to select a compressing method is proposed so that the difference between the original image and the compressed image by the selected method becomes the smallest by compressing and developing the original image with several methods when the image is stored in the frame memory 313.

Figure 3:
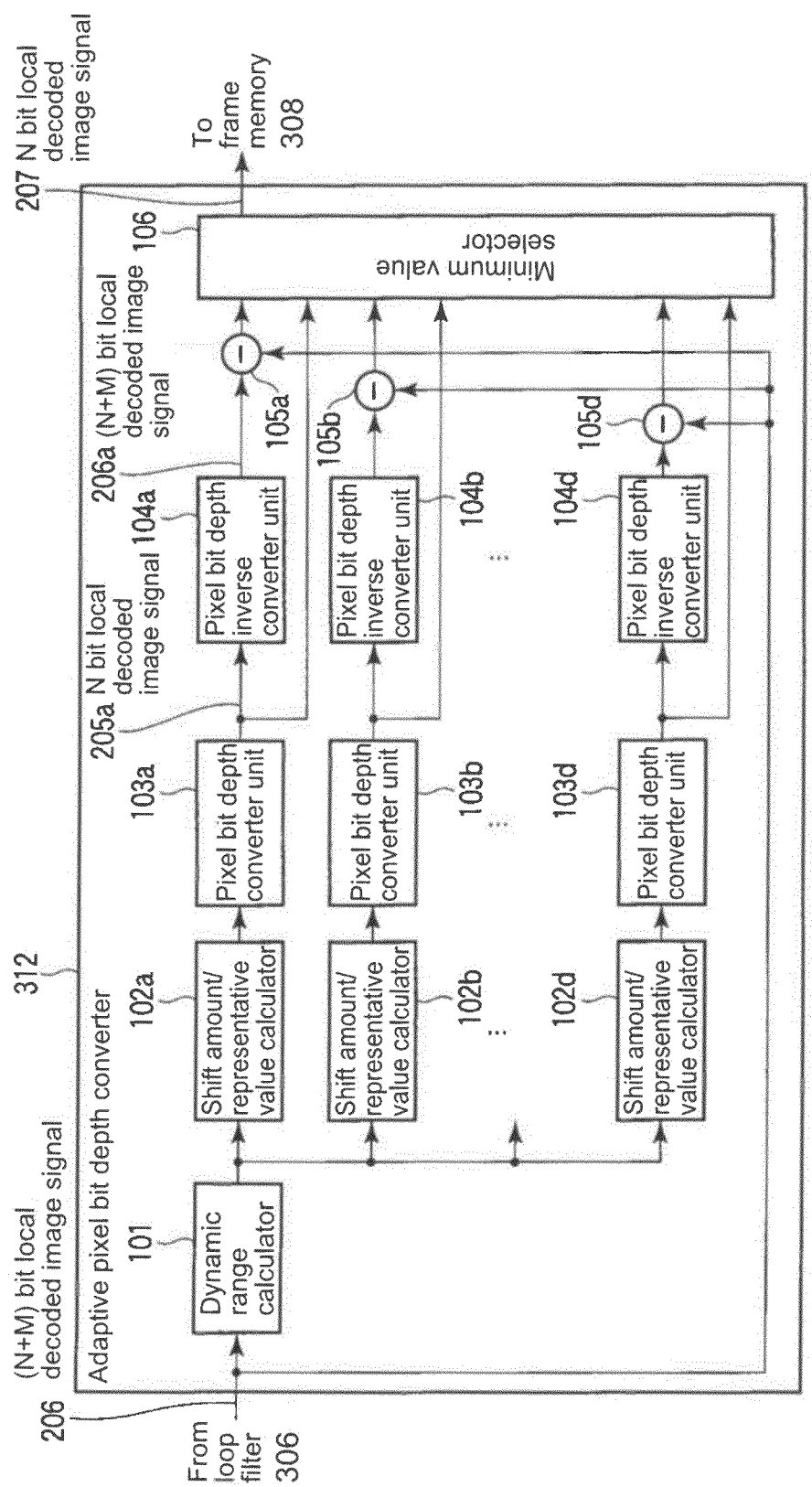
FIG. 3 is a figure showing an example of an adaptive pixel bit depth converter.

FIG. 3 is a block diagram showing an example of the detailed configuration of the adaptive pixel bit depth converter 312. As shown in FIG. 3, the adaptive pixel bit depth converter 312 includes a dynamic range calculator 101, shift amount/representative value calculators 102a-102d, pixel bit depth converter units 103a-103d, pixel bit depth inverse converter units 104a-104d, subtracters 105a-105d, and a minimum value selector 106.

The local decoded image signal 206 of the (N+M) bit depth is input to the adaptive pixel bit depth converter 312 in units of one block from the loop filter 306 as above-mentioned.

A dynamic range calculator 101 obtains the maximum Max and the minimum Min of the pixel value of the local decoded image signal 206 and calculates the dynamic range d=Max−Min which is difference between the Max and Min. The dynamic range calculator 101 calculates the maximum Max and the minimum M in units of one block which consists of, for example, 16×16 pixels and calculates the dynamic range d=Max−Min.

Next, the shift amount and the representative value are obtained so that an output signal becomes N bits by each of the shift amount/representative value calculators 102a-102d.

For example, the shift amount/representative value calculator 102a calculates the shift amount and the offset value for rounding off by the following equations (5) based on the local decoded image signal 206 and its dynamic range. Moreover, the minimum pixel value in the block is used as the representative value.

$$\text{shift}=\log 2(d)-N, \text{offset}=1<<(\text{shift}-1) \quad (5)$$

The pixel bit depth converter unit 103a converts the pixel bit depth. For example, when the image signal of an (N+M) bit depth input to the pixel bit depth converter unit 103a is set to I, an image signal 205a of an N bit depth output from the pixel bit depth converter unit 103a is expressed by the following equations (6).

$$I'=(I+\text{offset})>>\text{shift} \quad (6)$$

The pixel bit depth inverse converter unit 104a performs pixel bit depth conversion which is an inverse conversion to that of the pixel bit depth converter unit 103a, and converts the image signal 205a of the N bit depth into the image signal 206a of the (N+M) bit depth. For example, the (N+M) bit local decoded image signal 206a which is an output signal of the pixel bit depth inverse converter unit 104a is expressed by the following equation (7).

$$I''=I'<<\text{shift} \quad (7)$$

The subtracter 105a calculates the difference between the local decoded image signal 206 before conversion and the local decoded image signal 206a of the (N+M) bit.

The combination of the shift amount/representative value calculator 102b, the pixel bit depth converter unit 103b, the pixel bit depth inverse converter unit 104b, and the subtracter 105b converts the pixel bit depth in a different conversion system from the combination of the above-mentioned shift amount/representative value calculator 102a, the pixel bit depth converter unit 103a, the pixel bit depth inverse converter unit 104a and the subtracter 105a.

Similarly, the combination of the shift amount/representative value calculator 102c, the pixel bit depth converter unit 103c, the pixel bit depth inverse converter unit 104c, and the subtracter 105c, and the combination of the shift amount/representative value calculator 102d, the pixel bit depth converter unit 103d, the pixel bit depth converter inverse unit 104d, and the subtracter 105d also converts the pixel bit depth by a conversion system different from above combinations, respectively.

The minimum value selector 106 detects the minimum value among outputs from the subtracters 105a-105d. Then, the minimum value selector 106 outputs the information on the conversion system corresponding to the minimum value and the local decoded image signal 205 of the N bit depth converted by the conversion system to the frame memory 308 as the local decoded image signal 207. Moreover, the local decoded image signal 207 includes the information on the block of the image signal, the shift amount, the representative value and the conversion system. Thereby, the image signal can be stored in the frame memory 308 so that the deterioration of the image quality by conversion can be suppressed to the minimum.

Figure 4A:
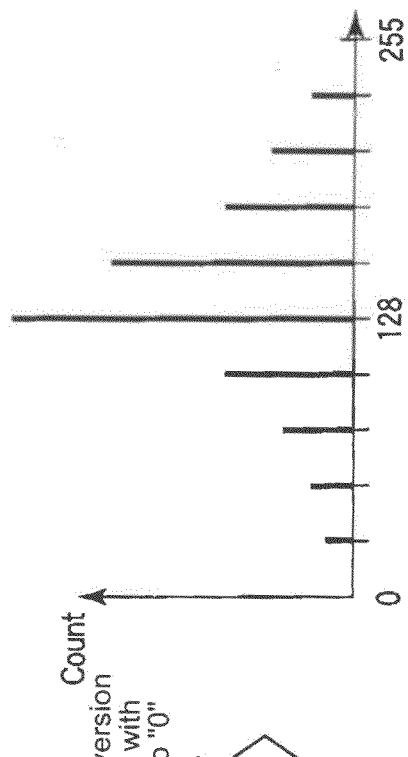
FIG. 4A to FIG. 4C are figures showing a quantization process by the adaptive pixel bit depth converter.
Figure 4B:
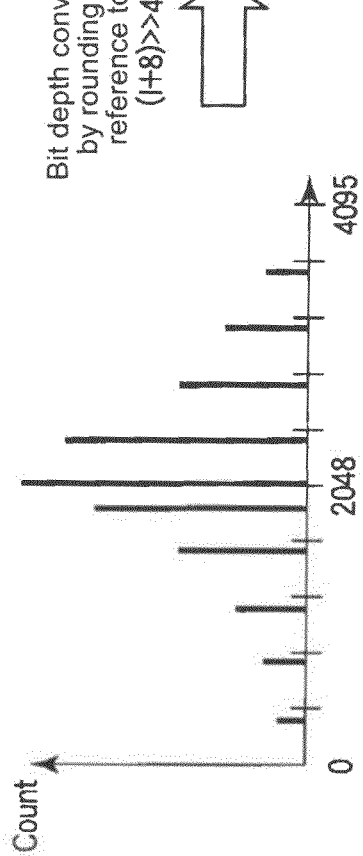
Figure 4C:
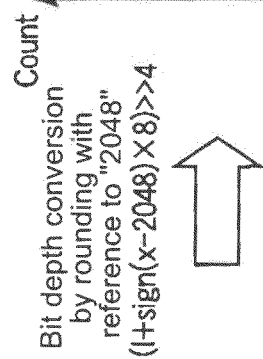

FIGS. 4A to 4C are figures showing a histogram of the image signal which is an input signal of the adaptive pixel bit depth converter 312 and the difference in conversions by methods of rounding-off when performing the quantization. In the histogram shown in FIGS. 4A to 4C, a horizontal axis shows the value of the image signal, and a vertical axis shows the number of the pixels with the image signal.

In the image signal I in which the pixel value has precision of 12-bit depth of 0-4095 as shown in FIG. 4 (A), an example of performing conversion into 8-bit depth is shown in FIG. 4 (B). In this case, the image signal I is rounded off with reference to 0. That is, after adding 8 to the image signal I, a shift processing to the right is carried out by 4 bits.

However, when the image signal I is color difference, the pixel signal value is centrally-distributed at the center pixel value 2048. Therefore, the method of different rounding-off from the usual method is employed for values smaller than 2048.

In the case such image signal I is color difference, an example of rounding-off with reference to the center value of the bit depth is shown in FIG. 4 (C). In this case, supposing that the bit depth is $2^N$, the rounding-off with reference to $2^{(N-1)}$ is performed, and the conversion is made. The pixel value after the conversion is expressed by the following equation (8).

$$I'=(I+\text{sign}(I-(1<<2(N+M-1)))\times(1<<2(\text{shift}-1))>>\text{shift} \quad (8)$$

In the equation (8), the operator sign (x) is defined as follows. When x is a negative number, the result of the operation becomes −1. When x is 0 and a positive number, the result of the operation becomes 1. Such conversion system enables a conversion in accordance with the distribution of the pixel values, and deterioration of the image quality by conversion is suppressed. The conversion system is effective for the conversion of the color difference signal.

FIGS. 5A to 5C are figures showing the histogram of the image signal I input to the adaptive pixel bit depth converter 312 and the difference between conversions by a bit-shift processing and a clipping processing. The clipping processing is carried out by outputting only the pixels of the predetermined range with reference to the representative value of the image signal.

In the histogram shown in FIG. 5, the horizontal axis shows the value of the image signal, and the vertical axis shows the number of the pixels with the image signal.

An example in the case of performing the bit-shift processing is shown in FIG. 5(B) by calculating the dynamic range "d" from the minimum Min and the maximum Max of the histogram. If the dynamic range "d" is calculated, the bit-shift value can be determined. For example, if the pixel bit depth N is 8 bits after conversion, and even "d" is slightly larger than 256, 1 bit or more bits shifts to the right. Therefore, cancellation of significant digits occurs by the bit-shift to the right, and a conversion error becomes large.

On the other hand, an example in the case of performing the clipping processing different from the bit shift processing is shown in FIG. 5 (C) to make the conversion error small. For example, value I' obtained by performing the clipping processing in which the minimum Min of the histogram is used for the representative value is expressed by the following equation (9).

$$I'=I-\min \text{ (if min}\leq I<\min+2^N) \quad (9)$$

Therefore, the dynamic range of the image signal can be set to the Nth power of 2, and N bit depth is secured. In addition, the maximum value or the middle value may be used for the representative value other than the minimum value of the histogram. When using the maximum value Max as the representative value, the conversion is performed based on the following equation (10).

$$I'=I-\max+2^N \text{ (if max}-2^N\leq I<\max) \quad (10)$$

Moreover, when using the middle value as the representative value, the conversion is performed based on the following equation (11).

$$I'=I-\text{middle}+2^{N-1} \text{ (if middle}-2^{N-1}\leq I\leq \text{middle}+2^{N-1}) \quad (11)$$

Figure 6:
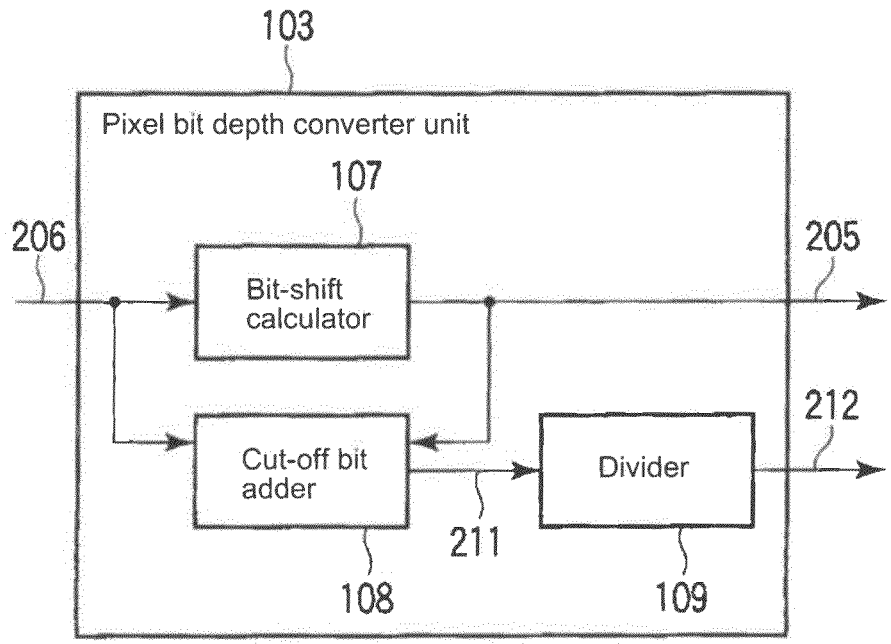
FIG. 6 is a figure showing a pixel bit depth converter unit.

FIG. 6 is a block diagram showing the configuration of the pixel bit depth converter unit 103 including a bit-shift calculator 107, a cut-off bit adder 108 and a divider 109. The pixel bit depth converter unit 103 is illustrated as a representative of above-mentioned pixel bit depth converter units 103a-103d.

If the pixel signal 206 input to the bit depth converter unit 103 is expressed with "x", the bit-shift calculator 107 converts the pixel signal 206 by a conversion equation expressed with the following equation (12).

$$x'=x+2^{(shift-1)}>>\text{shift} \quad (12)$$

The cut-off bit adder 108 calculates the cut-off value expressed with the following equation (13) by the bit-shift processing. Furthermore, the cut-off bit adder 108 adds the calculated cut-off bits to the pixel signals of all the blocks input to the bit depth converter unit 103.

$$x-(x'<<\text{shift}) \quad (13)$$

Figure 7:
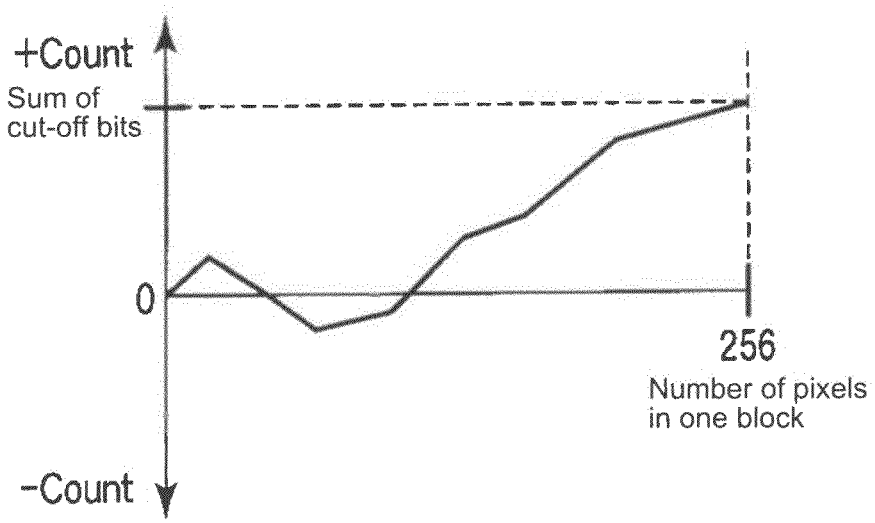
FIG. 7 is a figure for explaining an addition process by a cutting-off bit adder.

FIG. 7 is a graph for explaining addition processing by the cut-off bit adder 108. In the graph shown in FIG. 7, the horizontal axis shows the pixel number in a block, and the vertical axis shows a sum of cut-off bits (signal 211 in FIG. 6).

The divider 109 divides the sum of cut-off bits 211 with the number of blocks and outputs the value as the cut-off bit 212. The relation is expressed with the following equation (14) when the cut-off bit is expressed with "cutoff", and the number of pixels of one block is expressed with "n".

$$\text{cutoff} = \sum \frac{x-(x'<<\text{shift})}{n} \quad (14)$$

For example, if one block consists of 16×16 pixels, "n" becomes 256. In a pixel bit depth inverse converter unit 104 on the rear stage, the cut-off bit is added after conversion by shifting to the left in order to perform an inverse conversion. If the value after the inverse conversion and the shift amount are respectively set to "x''" and "shift", the equation of the inverse conversion is expressed with the following equation (15).

$$x''=(x'<<\text{shift})+\text{cutoff} \quad (15)$$

According to this embodiment, the cut-off bit can be restored to some extent, and the degradation of the image quality is suppressed at the time of converting the pixel bit depth.

Figure 8:
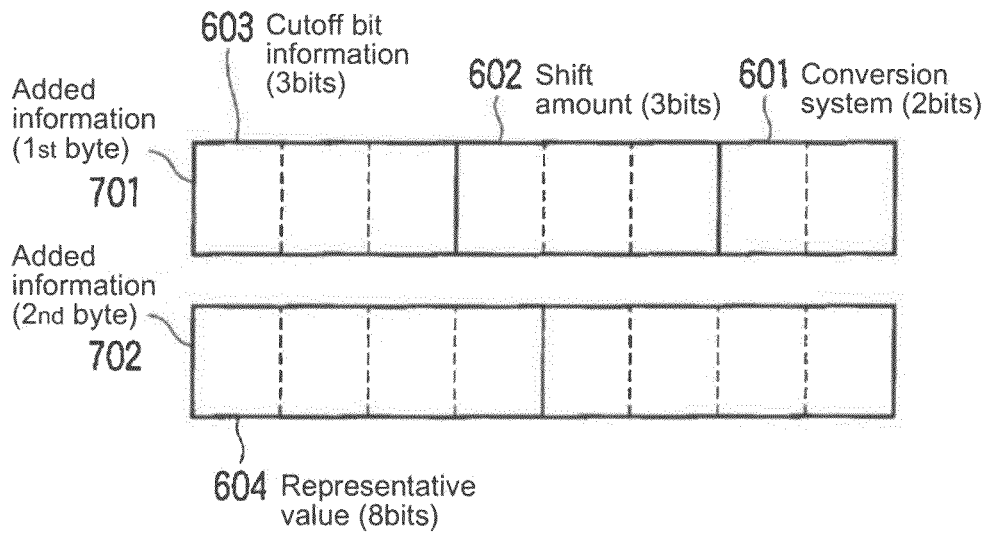
FIG. 8 is a figure showing a saving method of the bit depth conversion signal output from the adaptive pixel bit depth converter.
Figure 9:
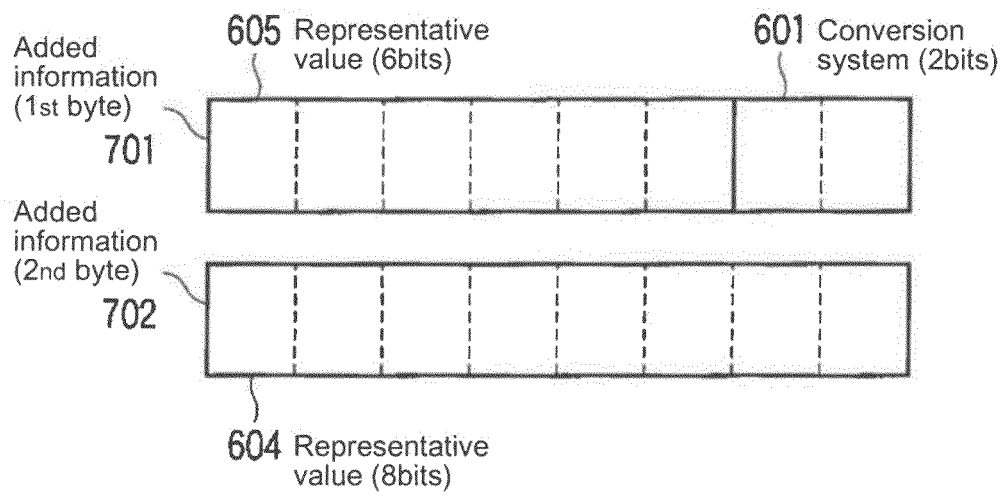
FIG. 9 is a figure showing another example of the saving method of the bit depth conversion signal output from the adaptive pixel bit depth converter.

FIG. 8 and FIG. 9 are figures showing examples of saving methods of the bit depth conversion signal 207 output from the adaptive pixel bit depth converter 312.

Hereinafter, the shift amount, the representative value, the conversion system, etc. contained in the bit depth conversion signal 207 are collectively called an additional information. As shown in the figure, the additional information includes the conversion system 601, the shift amount 602, the cutoff bit information 603 and the representative values 604 and 605.

According to this embodiment, it enables to select whether the additional information is saved in accordance with the conversion system in the format shown in FIG. 8 or format shown in FIG. 9.

For example, when the conversion system 601 is expressed by "00", the additional information is saved in the format shown in FIG. 9, and when the conversion system 601 is expressed with the figures other than "00", the additional information is saved in the format shown in FIG. 8. How to assign the additional information can be set arbitrarily. For example, when using two bytes of memory for the additional information are used, the bits of the first byte 701 is assigned by turns from a lower bit, that is, two bits 601 for the conversion system, three bits 602 for the shift amount and three bits 603 for the cutoff bit information.

For example, when the value of M for increasing the pixel bit depth is 0≤M≤6, and even the dynamic range of the block is the largest, the shift amount 602 can be enough expressed by three bits. Moreover, since the bit-shift processing is unnecessary in the case where the dynamic range is the Nth power of 2 or less, or the clipping processing is carried out, the additional information is saved as shown in FIG. 9. That is, since it is not necessary to save the cut-off bit information, higher 6 bits of the first byte and all 8 bits of the second byte, that is, the total 14 bits can be assigned to the representative value.

Thus, higher-precision conversion information can be saved by making the additional information variable depending on the conversion system, and the degradation of the image quality can be suppressed.

[Modification of the Adaptive Pixel Bit Depth Converter]

Figure 10:
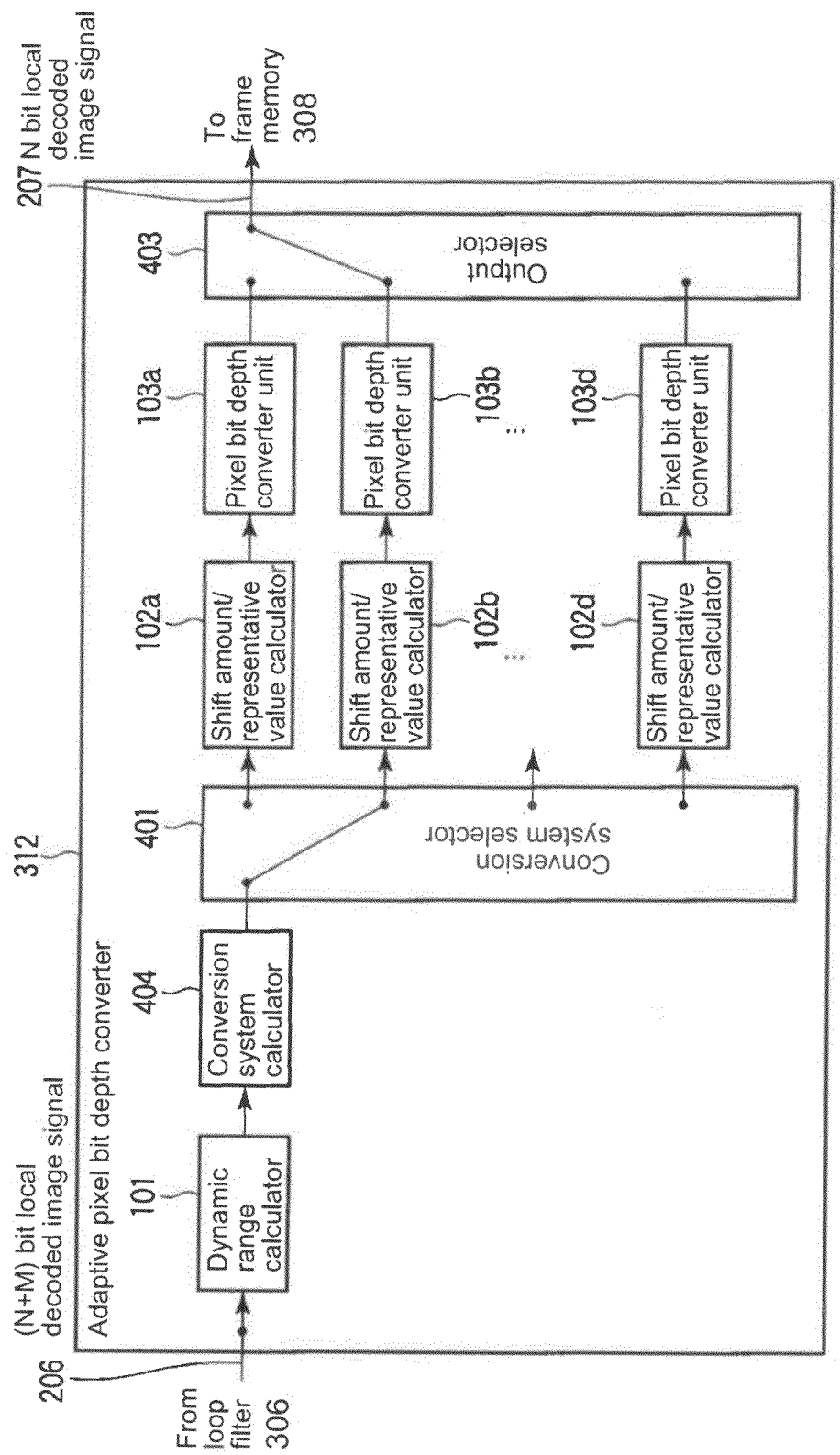
FIG. 10 is a figure showing a modification of the adaptive pixel bit depth converter.

FIG. 10 is a block diagram showing a modification of the adaptive pixel bit depth converter 312. The adaptive pixel bit depth converter 312 is equipped with a dynamic range calculator 101, a conversion system calculator 404, a conversion system selector 401, a shift amount/representative value calculators 102a-102d, pixel bit depth converter units 103a-103d and an output selector 403.

The adaptive pixel bit depth converter 312 is connected between the loop filter 306 and the frame memories 308 in the above-mentioned FIG. 1. The adaptive pixel bit depth converter 312 receives a local decoded image signal 206 of an (N+M) bit as an input signal and outputs a local decoded image signal 207 of an N bit. The local decoded image signal 207 of the N bit includes an image signal of the N bit depth, a shift amount, a representative value and information on the conversion system.

The dynamic range calculator 101 calculates the maximum and the minimum of the input image signal and outputs the difference between the maximum and minimum values to the conversion system calculator 404. Next, the conversion system calculator 404 determines the conversion system using the information on the dynamic range and the image signal. For example, since it turns out that the shift amount is set to "0" if the dynamic range is N bits or less, a conversion process which performs the clipping processing to clip the image area of the (N+M) bits to get the image area of the N bits is selected by the conversion system selector 401. Furthermore, it becomes possible to select a conversion system which is different between luminosity and color difference by reading out the color component of the image signal. The shift amount/representative value calculators 102a-102d and the pixel bit depth converter units 103a-103d carry out the same operation as the above-mentioned embodiment. The output selector 403 selects the image signal converted using one of the conversion systems calculated by the conversion system calculator 404. By selecting either one of some conversion systems before converting the bit depth, and then converting the bit depth, it becomes possible to store the image signal in the frame memory in the smaller amount of operations than the above embodiment and also by suppressing more the deterioration of the image quality than the conventional method.

[Pixel Bit Depth Inverse Converter]

Figure 11:
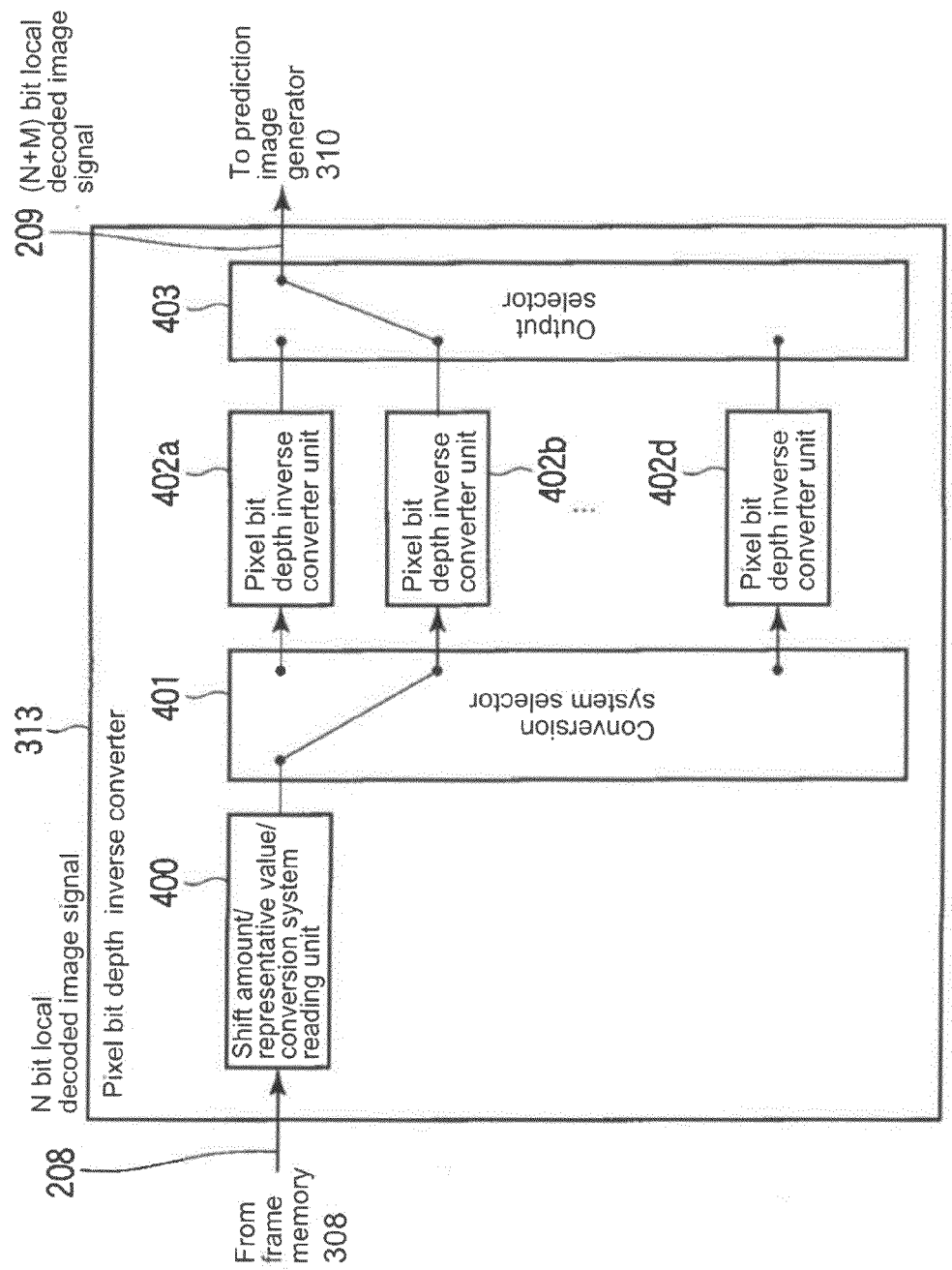
FIG. 11 is a figure showing a configuration example of a pixel bit depth inverse converter.

FIG. 11 is a block diagram showing the configuration of the pixel bit depth inverse converter 313. The pixel bit depth inverse converter 313 is equipped with a shift amount/representative value/conversion system reading unit 400, a conversion system selector 401, pixel bit depth inverse converter units 402a-402d and an output selector 403.

The pixel bit depth inverse converter 313 is connected between the frame memory 308 and the prediction image generator 310 in the above-mentioned FIG. 1. The pixel bit depth inverse converter 313 receives an image signal of an N bit depth and an N bit local decoded image signal 208 containing a shift amount, a representative value and a conversion system as an input signal and outputs a local decoded image signal 209 of an (N+M) bit depth.

The shift amount/representative value/conversion system reading unit 400 reads out a conversion system from the N bit local decoded image signal 208, and the conversion system selector 401 selects one of the pixel bit depth inverse converter units 402 to be used corresponding to the selected conversion system. Each of the pixel bit depth inverse converter units 402a-402d performs the same processing as each of the pixel bit depth inverse converter units 104a-104d with which the adaptive pixel bit depth converter 312 shown in FIG. 3 is equipped. The output selector 403 selects one of the outputs of the selected pixel bit depth inverse converter units 402a-402d as an output image signal in which the conversion of the local decoded image signal is done using the selected conversion system.

[Image Decoding Apparatus]

Figure 12:
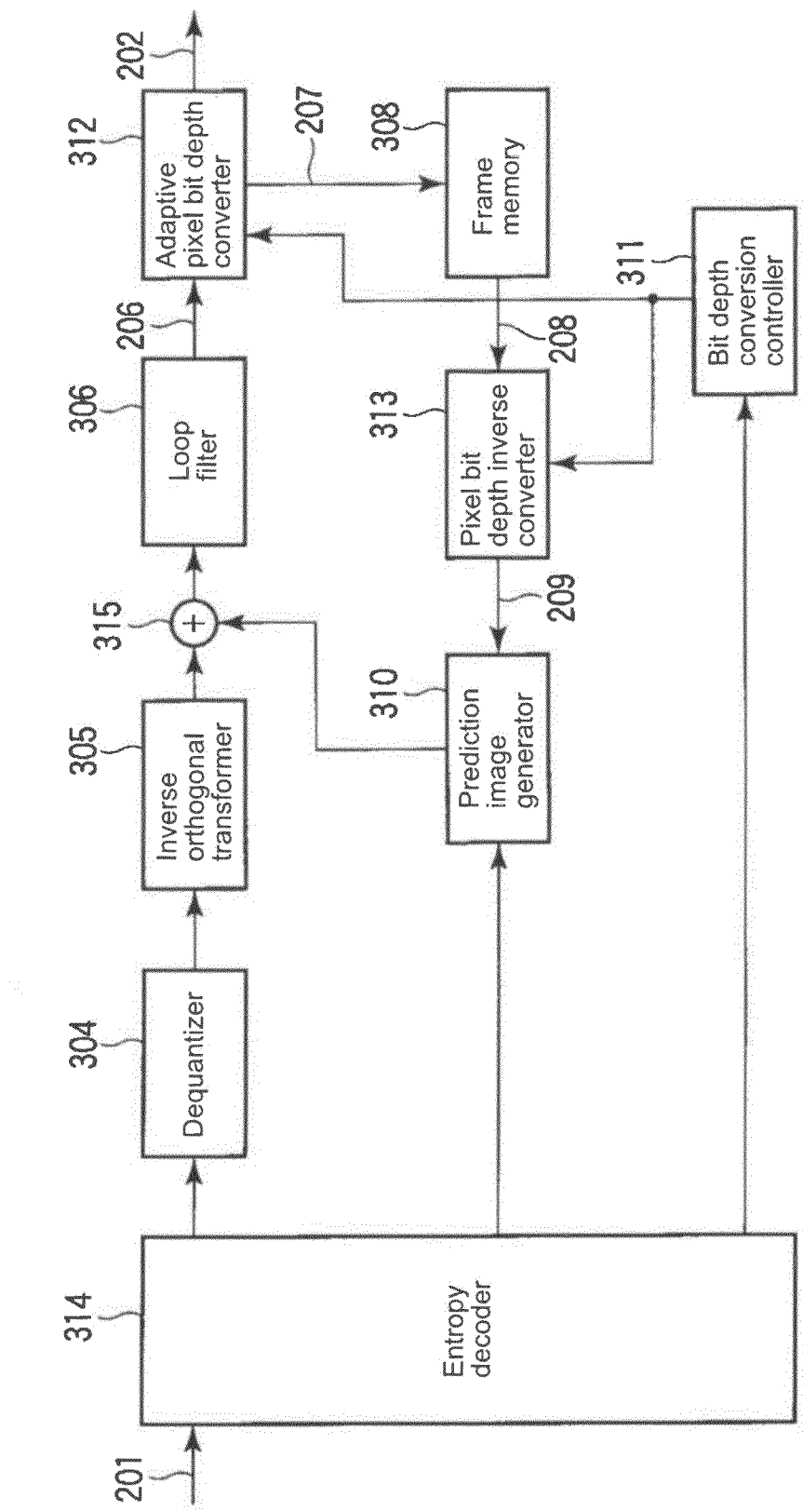
FIG. 12 is a figure showing an image decoding apparatus according to another embodiment.

Next, the image decoding apparatus according to another embodiment is explained with reference to FIG. 12. In FIG. 12, the image decoding apparatus includes an entropy decoder 314, a dequantizer 304, an inverse orthogonal transformer 305, an adder 315, a loop filter 306, an adaptive pixel bit depth converter 312, a frame memory 308, a pixel bit depth inverse converter 313, a prediction image generator 310 and a bit depth conversion controller 311.

The image decoding apparatus receives an encoded image signal 201 of an (N+M) bit depth as an input signal and outputs an image signal 202 of an N bit depth. The entropy decoder 314, the dequantizer 304, the inverse orthogonal transformer 305, the adder 315, the loop filter 306, the frame memory 308, and the prediction image generator 310 and the bit depth conversion controller 311 carry out the same operation as general composition.

The adaptive pixel bit depth converter 312 and the pixel bit depth inverse converter 313 respectively carry out the same operation as the above-mentioned image encoding apparatus. Accordingly, while being able to use the image signal of the (N+M) bit depth in the operation inside the decoding apparatus, the memory capacity in the frame memory 308 can be suppressed to the capacity to store the image signal data of the N bit depth.

That is, according to this embodiment, when the pixel bit depth increases, it becomes possible to reduce the capacity of the frame memory by storing the image signal into the frame memory by adaptively compressing the image signal with decrease in the quantization error and without dropping the decoding efficiency.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiment. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:

1. An image encoding apparatus, comprising:
a pixel bit depth increase unit to convert bit depth of each pixel of an input image formed of a plurality of pixels each having an N bit depth into an (N+M) bit depth larger than the N bit depth by M bits;
a prediction image generator to generate a prediction image of the (N+M) bit depth corresponding to the input image of the (N+M) bit depth from a reference image of the (N+M) bit depth;
a subtracter to calculate a differential signal of between the input image of the (N+M) bit depth and the prediction image of the (N+M) bit depth;
an encoding unit to output encoded image information by encoding the differential signal;
a decoding unit to output a decoded difference image based on the encoded image information;
an adder to add the prediction image of the (N+M) bit depth to the decoded difference image and output a decoded image of the (N+M) bit depth;
a pixel bit depth converter to convert the bit depth of each pixel of the decoded image of the (N+M) bit to the N bit depth selectively using one of a plurality of mutually different conversion systems;
a reference image storing memory to store the decoded image converted into the N bit depth as the reference image; and
a pixel bit depth inverse converter to convert the bit depth of each pixel of the reference image of the N bit depth read out from the reference image storing memory into the (N+M) bit depth larger than the N bit depth by M bits in accordance with the conversion system, wherein the pixel bit depth converter includes:
a plurality of pixel bit depth converter units to convert a first local signal in units of one block of the decoded image of the (N+M) bit depth into a plurality of second local signals of the N bit depth with a plurality of mutually different conversion systems,
a plurality of pixel bit depth inverse converter units to convert the second local signals into a plurality of third local signals of the (N+M) bit depth, respectively, subtracters to calculate a differential signal between the first local signal and the third local signal, and a selector to output the second local signal selected based on the differential signal calculated by the subtractor and an additional information containing the conversion system of the second local signal as the decoded image of the N bit depth.

2. The image encoding apparatus according to claim 1, wherein the pixel bit depth converter outputs different type additional information depending on the conversion system.

3. The image encoding apparatus according to claim 1, wherein the pixel bit depth increase unit converts each component of the input image into a different color space after converting the value of each pixel of the input image of the N bit depth into the (N+M) bit depth larger than the N bit depth by M bits, and the pixel bit depth converter unit converts the bit depth according to the kinds of the color spaces with reference to the value of a predetermined position of distribution of the pixel value in the first local signal.

4. The image encoding apparatus according to claim 1, wherein the pixel bit depth converter unit carries out a bit-shift conversion by bit-shift amount decided by distribution of the pixel values of the first local signal as one of the conversion systems, and the additional information further includes information showing the bit-shift amount.

5. The image encoding apparatus according to claim 4, wherein the bit depth converter unit includes:

a bit-shift calculator to convert the first local signal into the second local signal based on the bit-shift amount by the bit-shift conversion;

a cut-off bit adder to add the value cut off by the bit-shift conversion, and a divider to output the cut-off bits obtained by dividing a sum of the cut-off bits output from the cut-off bit adder with the number of the blocks, and the additional information further includes information expressing the cut-off bit.

6. The image encoding apparatus according to claim 1, wherein the pixel bit depth converter unit performs a conversion by a clipping processing to output the pixels of a predetermined range with reference to a representative value of distribution of the pixel values in the first local signal as one of the conversion systems, and the additional information further includes information expressing the representative value.

7. An image encoding apparatus, comprising:

a pixel bit depth increase unit to convert bit depth of each pixel of an input image formed of a plurality of pixels each having an N bit depth into an (N+M) bit depth larger than the N bit depth by M bits;

a prediction image generator to generate a prediction image of the (N+M) bit depth corresponding to the input image of the (N+M) bit depth from a reference image of the (N+M) bit depth;

a subtracter to calculate a differential signal of between the input image of the (N+M) bit depth and the prediction image of the (N+M) bit depth;

an encoding unit to output encoded image information by encoding the differential signal;

a decoding unit to output a decoded difference image based on the encoded image information;

an adder to add the prediction image of the (N+M) bit depth to the decoded difference image and output a decoded image of the (N+M) bit depth;

a pixel bit depth converter to convert the bit depth of each pixel of the decoded image of the (N+M) bit to the N bit depth selectively using one of a plurality of mutually different conversion system;

a reference image storing memory to store the decoded image converted into the N bit depth as the reference image; and a pixel bit depth inverse converter to convert the bit depth of each pixel of the reference image of the N bit depth read out from the reference image storing memory into the (N+M) bit depth larger than the N bit depth by M bits in accordance with the conversion system, wherein the pixel bit depth converter includes:

a plurality of pixel bit depth converter units to convert a first local signal in units of one block of the decoded image of the (N+M) bit depth into a plurality of second local signals of the N bit depth with a plurality of mutually different conversion systems, a calculator to calculate a conversion system based on the first local signal, and a selector to output the second local signal selected based on the calculated conversion system and an additional information containing the signal of the conversion system for the second signal as the decoded image of the N bit depth.

8. The image encoding apparatus according to claim 7, wherein the pixel bit depth increase unit converts each component of the input image into a different color space after converting the value of each pixel of the input image of the N bit depth into the (N+M) bit depth larger than the N bit depth by M bits, and the pixel bit depth converter unit converts the bit depth according to the kinds of the color spaces with reference to the value of a predetermined position of distribution of the pixel value in the first local signal.

9. The image encoding apparatus according to claim 7, wherein the pixel bit depth converter unit carries out a bit-shift conversion based on bit-shift amount decided by distribution of the pixel values in the first local signal as one of the conversion systems, and the additional information further includes information showing the bit-shift amount.

10. The image encoding apparatus according to claim 9, wherein the bit depth converter unit includes:

a bit-shift calculator to convert the first local signal into the second local signal based on the bit-shift amount by the bit-shift conversion;

a cut-off bit adder to add the value cut off by the bit-shift conversion, and a divider to output the cut-off bits obtained by dividing a sum of the cut-off bits output from the cut-off bit adder with the number of the blocks, and the additional information further includes information expressing the cut-off bit.

11. The image encoding apparatus according to claim 7, wherein the pixel bit depth converter unit performs a conversion by a clipping processing to output the pixels of a predetermined range with reference to a representative value of distribution of the pixel values in the first local signal as one of the conversion systems, and the additional information further includes information expressing the representative value.

12. The image encoding apparatus according to claim 7, wherein the pixel bit depth converter outputs different type additional information depending on the conversion system.

13. The image encoding apparatus according to claim 1, wherein the pixel bit depth inverse converter includes:
   a plurality of pixel bit depth converter unit to convert a local signal in units of one block of the reference image of the N bit depth into the (N+M) bit depth with a plurality of mutually different conversion systems, and
   a selector to select one of the outputs of the pixel bit depth converter units based on the additional information contained in the local signal and output as the reference image of the (N+M) bit depth.

14. An image decoding apparatus, comprising:
   a decoding unit to output a decoded difference image on receiving an encoded image information of an (N+M) bit depth;
   a prediction image generator to generate a prediction image of the (N+M) bit depth by a reference image of the (N+M) bit depth using the encoded image information;
   an adder to add the prediction image of the (N+M) bit depth to the decoded difference image and output a decoded image of the (N+M) bit depth;
   a pixel bit depth converter to convert each pixel of the decoded image of the (N+M) bit into the N bit depth selectively using one of a plurality of mutually different conversion systems;
   a reference image storing memory to store the decoded image converted into the N bit depth as the reference image; and
   a pixel bit depth inverse converter to convert the bit depth of each pixel of the reference image of the N bit depth into the (N+M) bit depth larger than N bit depth by M bits in accordance with the conversion system, wherein the pixel bit depth converter includes:
      a plurality of pixel bit depth converter units to convert a first local signal in units of one block of the decoded image of the (N+M) bit depth into a plurality of second local signals of the N bit depth with a plurality of mutually different conversion systems,
      a plurality of pixel bit depth inverse converter units to convert the second local signals into a plurality of third local signals of the (N+M) bit depth, respectively,
      subtracters to calculate a differential signal between the first local signal and the third local signal, and
      a selector to output the second local signal selected based on the differential signal calculated by the subtractor and an additional information containing the conversion system of the second local signal as the decoded image of the N bit depth.

15. An image encoding method, comprising:
   converting a bit depth of each pixel of an input image formed of a plurality of pixels each having an N bit depth into an (N+M) bit depth larger than the N bit depth by M bits;
   generating a prediction image of the (N+M) bit depth corresponding to the input image of the (N+M) bit depth by a reference image of the (N+M) bit depth;
   obtaining a differential signal between the input image of the (N+M) bit depth and the prediction image of the (N+M) bit depth;
   outputting an encoded image information by encoding the differential signal;
   outputting a decoded difference image based on the encoded image information;
   adding the prediction image of the (N+M) bit depth to the decoded difference image and outputting a decoded image of the (N+M) bit depth;
   converting the bit depth of each pixel of the decoded image of the (N+M) bit into the N bit depth selectively using one of a plurality of mutually different conversion systems;
   storing the decoded image converted into the N bit depth as the reference image; and
   converting the bit depth of each pixel of the reference image of the N bit depth read out from the reference image storing memory into the (N+M) bit depth larger than N bit depth by M bits in accordance with the conversion system, wherein
   the converting the bit depth of each pixel of the decoded image of the (N+M) bit into the N bit depth includes:
   converting a first local signal in units of one block of the decoded image of the (N+M) bit depth into a plurality of second local signals of the N bit depth with a plurality of mutually different conversion system,
   converting the second local signals into a plurality of third local signals of the (N+M) bit depth, respectively,
   calculating a differential signal between the first local signal and the third local signal, and
   outputting the second local signal selected based on the differential signal and an additional information containing the conversion system of the second local signal as the decoded image of the N bit depth.

16. An image decoding method, comprising:
   outputting a decoded difference image on receiving an encoded image information of an (N+M) bit depth;
   generating a prediction image of the (N+M) bit depth by a reference image of the (N+M) bit depth using the encoded image information;
   adding the prediction image of the (N+M) bit depth to the decoded difference image and outputting a decoded image of the (N+M) bit depth;
   converting the bit depth of each pixel of the decoded image of the (N+M) bit into the N bit depth selectively using one of a plurality of mutually different conversion systems;
   storing the decoded image converted into the N bit depth as the reference image; and
   converting the bit depth of each pixel of the reference image of the N bit depth into the (N+M) bit depth larger than N bit depth by M bits in accordance with the conversion system, wherein
   the converting the bit depth of each pixel of the decoded image of the (N+M) bit into the N bit depth includes:
   converting a first local signal in units of one block of the decoded image of the (N+M) bit depth into a plurality of second local signals of the N bit depth with a plurality of mutually different conversion systems,
   converting the second local signals into a plurality of third local signals of the (N+M) bit depth, respectively,
   calculating a differential signal between the first local signal and the third local signal, and
   outputting the second local signal selected based on the differential signal and an additional information containing the conversion system of the second local signal as the decoded image of the N bit depth.

* * * * *